United States Patent Office 3,062,770
Patented Nov. 6, 1962

3,062,770
COMPOSITION CONSISTING ESSENTIALLY OF (a) A REACTION PRODUCT OF TRIMELLITIC ANHYDRIDE AND ALKYLENE OXIDE AND (b) AN EPOXY RESIN
Arthur G. Hirsch, Dyer, and Benjamin A. Bolton, Gary, Ind., and Thomas A. Shelby, Scranton, Pa., assignors to Standard Oil Company, Chicago, Ill., a corporation of Indiana
No Drawing. Filed Mar. 21, 1960, Ser. No. 16,156
5 Claims. (Cl. 260—32.8)

This invention relates to compositions adapted for the production of thermoset resins and particularly heat cured (baked) films.

Thermosetting resins are obtained from the condensation reaction of trimellitic anhydride and certain alkylene oxides. These baking resins have a disability in that high quality surface coatings are obtained only when the heat cure (baking) is carried out at temperatures of 400° F. or even somewhat higher. A greater economic potential would exist for resins based upon trimellitic anhydride and these alkylene oxides if the baking temperature could be reduced to, for instance, 350° F. or even lower.

It has been discovered that compositions adapted for the production of thermoset resins of good quality at baking temperatures on the order of 300–350° F. are obtained by the use of a mixture of an epoxy intermediate resin and the condensation reaction product of trimellitic anhydride and alkylene oxide. The alkylene oxides have from between 2–4 carbon atoms. The condensation reaction product is characterized by an acid number from about 30 to about 225.

The condensation reaction resin component of the invention is prepared by reacting trimellitic anhydride and an alkylene oxide having 2–4 carbon atoms, in desired proportions in the presence of an alkaline catalyst at a temperature between about 20° C. and about 200° C. It is preferred to employ a reaction temperature below about 120° C. in order to avoid cross-linking and gelling. As catalysts there may be employed inorganic or organic basis such as diethylamine, dibutylamine, piperidine and the like and tertiary amines such as trimethylamine, triethanolamine, pyridine and the like. Amines are preferred and are used usually in an amount of about 0.1% to about 5% based on the weight of trimellitic anhydride. Suitably, the reaction is effected during a period of 2–24 hours, more commonly 2–8 hours.

Although, ethylene oxide, propylene oxide and the various butylene oxides are all suitable reactants in the preparation of the resin, propylene oxide is the preferred reactant.

The trimellitic anhydride and alkylene oxide are reacted in proportions such that the solid resin product has an acid number (mg. of KOH per gram of resin) from at least about 30 to about 225. The mole ratio of oxide to anhydride generally falls in the range of 2.7:1 to 1.8:1. Solid resin having an acid number from about 70 to 130 is particularly preferred for the preparation of superior quality surface coatings. The solid resin is readily taken into water solution by reaction with aqueous ammonium hydroxide or aqueous solution of a lower molecular weight aliphatic amine. Particularly suitable amines are morpholine and monoethanolamine.

The epoxy intermediate resin material may be any one of those available. In general, these epoxies are reaction products of epichlorohydrin and a polyol, either an aliphatic polyol or an aromatic polyol. It is not considered necessary to set out any long recitation of particular polyols; reference is made for this purpose to the prior art, particularly chapter 10 of "High Polymers," volume X, Interscience Publishers, Inc., 1956, and Skiest, "Epoxy Resins," chapter 2, Reinhold, 1958.

The epoxy intermediate resin is preferably derived from the reaction of epichlorohydrin and a bisphenol. The bisphenols utilized may be bisphenol, a substituted bi-phenol, particularly those containing alkyl substituents having from 1 to 4 carbon atoms, or complex bi-phenol ethers or the more complex bisphenols having an alkyl group joining the two phenyl groups. A particularly suitable bisphenol reactant is 2,2'-bis-(p-hydroxyphenolpropane) which is commonly known as bisphenol A. Those intermediates having an epoxide equivalent weight from about 165 to 225 are particularly suitable. The term "epoxide equivalent weight" as used herein is in accord with the usage of Stivala in chapter 10 of "High Polymers," volume X, Schildknecht in Polymer Process, Interscience Publishers, Inc., 1956.

The defined resin and the defined epoxy intermediate resin are present in the composition of the invention in a ratio which is dependent upon the particular resin, the particular epoxy intermediate, the baking temperature, and the qualities of the final thermoset resin. In the production of films such as surface coatings, utilizing an epoxy intermediate resin from the reaction of epichlorohydrin and a bisphenol, particularly bisphenol A, high quality thermoset resins are obtained when the trimellitic anhydride-alkylene oxide resin and the epoxy intermediate resin are present in a weight ratio from about 8:2 to 4:6 respectively. That is, 8 parts by weight of the defined resin to 2 parts by weight of the defined epoxy intermediate in the one instance, and 4 parts by weight of the defined resin to 6 parts by weight of the defined epoxy intermediate in the other instance.

The thermoset resin affording composition of the invention can be readily placed in solution in a low boiling oxygenated aliphatic hydrocarbon such as, ethanol, methylethylketone, isopropylether and ethyl acetate for use as a coating composition. It is preferred to use a low boiling alkanol or alkanone which readily evaporates at atmospheric temperatures and conditions leaving behind the resin portion of composition. Most suitable of these are methanol, ethanol, isopropanol, acetone and methylethyl ketone.

EXAMPLE

The composition of the invention and results obtainable therefrom are illustrated by the following working example. Films of the illustrative compositions and also films from the trimellitic anhydride-propylene oxide resin base were baked for 30 minutes on a tin plate at temperatures of 250° F., 300° F., and 350° F. respectively. Results obtained with two commercially available epichlorohydrin-bisphenol A resins (Epon 828 and Epon 1004) are set out in Table I. The results of Table I show that at all temperatures the composition of the invention were superior to the trimellitic anhydride-propylene oxide resin base films.

The base baking resin used in film appraisals is a propylene oxide-trimellitic anhydride condensation product made as follows: Trimellitic anhydride, 384 grams; propylene oxide, 464 grams; and pyridine, 2 ml.

The ingredients were mixed in a 3-necked flask equipped with stirrer, thermometer, and reflux condenser with takeoff. No heat was required during the early stages of the reaction. The reaction was exothermic so it started to reflux within one hour at a temperature of 42–44° C. Complete solution was achieved in the next hour. A water-bath was required to maintain reflux. After the third hour, propylene oxide was stripped from the reaction mixture at the rate of 200 ml. per hour. A total of 370 cc. of propylene oxide was recovered. The temperature at this time had risen to 85° C. After ½ hour at this temperature, the reaction product was so viscous that stirring could no longer be maintained. The mixture was then poured into a container to cool. The cooled product was a hard, brittle resin with the following characteristics:

Acid number _____ 95
Hydroxyl number _____ 123
Saponification number _____ 504
Molecular weight _____ 1710±90

This product required a cure time of 30 minutes at 400° F. in order to have acceptable film properties.

*Table I*

| No. | Resin (grams) | Epoxy (grams) | Flexibility [1] (⅛″ mandrel) | Impact-resistance (inch-pounds) | Mar-resistance | Resistance to 2% sodium hydroxide (minutes to) denude |
|---|---|---|---|---|---|---|
| Series I—250° F. baking temp.: | | | | | | |
| 1 | 10 | 0 | Fail | <10 | Tacky | 5 |
| 2a [2] | 6 | 4 | ...do | <10 | Poor | [3] 240 |
| 3b [2] | 4 | 6 | Fine cracks | <10 | ...do | [3] 240 |
| Series II—300° F. baking temp.: | | | | | | |
| 4 | 10 | 0 | Cracks | <10 | ...do | 5 |
| 4a | 6 | 4 | ...do | <10 | ...do | [3] 240 |
| 5b | 6 | 4 | ...do | <10 | Good | [4] 240 |
| 6b | 4 | 6 | Pass | >80 | ...do | [3] 240 |
| Series III—350° F. baking temp.: | | | | | | |
| 7 | 10 | 0 | Cracks | <10 | ...do | 5 |
| 8a | 8 | 2 | Pass | <10 | ...do | [4] 240 |
| 9a | 6 | 4 | Cracks | <10 | Poor | [3] 240 |
| 10b | 6 | 4 | V.F. cracks | <10 | Good | 240 |
| 11b | 4 | 6 | Pass | >80 | ...do | [3] 240 |

[1] Flexibility: Fail, indicates product flakes off. Cracks, indicate breaks but good adhesion.

[2] See the following table.

| | Epoxide equivalent weight | Hydroxyl equivalent weight |
|---|---|---|
| a. Epichlorohydrin-Bisphenol A | 175–210 | 85 |
| b. Epichlorohydrin-Bisphenol A | 870–1,025 | 175 |

[3] Pass. [4] White.

NOTE.—Dry film thickness: 1–1.5 mils.

The preceding blends of this baking resin were made up to 50% solids in acetone solution, applied as ten mil wet films to tin plate, and the following results were obtained on baking these films at the stated temperatures for 30 minutes.

Thus, having described the invention, what is claimed is:

1. A composition adapted for the production of a thermoset resin, which composition consists essentially of (a) a resin that is the condensation reaction product of trimellitic anhydride and alkylene oxide having from 2–4 carbon atoms in a mole ratio of said oxide to said anhydride of about 1.8–2.7:1 and characterized by an acid No. from about 30 to about 225 and (b) an epoxy intermediate resin reaction product of epichlorohydrin and a bisphenol and wherein said resin and said epoxy are present in a weight ratio from about 8:2 to 4:6 respectively.

2. The composition of claim 1 wherein said oxide is propylene oxide.

3. The composition of claim 1 wherein said resin has an acid No. from about 70 to about 130.

4. The composition of claim 1 wherein a solvent is present in an amount sufficient to dissolve said resin and said epoxy and said solvent being selected from the class consisting of methanol, ethanol, isopropanol, acetone, methylethyl ketone, isopropyl ether and ethyl acetate.

5. The composition of claim 4 wherein said solvent is acetone.

References Cited in the file of this patent

UNITED STATES PATENTS

| 2,683,131 | Cass | July 6, 1954 |
| 2,855,379 | Heinen | Oct. 7, 1958 |
| 2,890,195 | Phillips et al. | June 9, 1959 |

FOREIGN PATENTS

| 788,426 | Great Britain | Jan. 2, 1958 |